(12) United States Patent
Boden et al.

(10) Patent No.: US 6,266,707 B1
(45) Date of Patent: Jul. 24, 2001

(54) SYSTEM AND METHOD FOR IP NETWORK ADDRESS TRANSLATION AND IP FILTERING WITH DYNAMIC ADDRESS RESOLUTION (75) Inventors: Edward B. Boden, Vestal; Wesley A. Brzozowski, Endicott; Mark C. Bullock, Apalachin; Scott B. Parks, Johnson City; Michael D. Williams, Owego, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/135,148

(22) Filed: Aug. 17, 1998

(51) Int. Cl.[7] .................................................. G06F 15/16
(52) U.S. Cl. ......................... 709/245; 709/244; 709/232; 370/401
(58) Field of Search .................................... 370/401, 392, 370/397; 709/245, 240, 243, 244, 249, 232

(56) References Cited

U.S. PATENT DOCUMENTS

| 4,896,319 | | 1/1990 | Lidinsky et al. ...................... 370/60 |
|---|---|---|---|
| 5,185,860 | | 2/1993 | Wu ....................................... 395/200 |
| 5,548,731 | | 8/1996 | Chang et al. ......................... 395/280 |
| 5,566,170 | * | 10/1996 | Bakke et al. ......................... 370/392 |
| 5,586,025 | * | 12/1996 | Tsuji et al. ........................... 707/500 |
| 5,636,216 | | 6/1997 | Fox et al. ............................. 370/402 |
| 5,708,659 | | 1/1998 | Rostoker et al. ..................... 370/392 |
| 5,778,231 | * | 7/1998 | Van Hoff et al. ........................ 717/5 |
| 5,781,534 | * | 7/1998 | Perlman et al. ...................... 370/248 |
| 5,835,726 | * | 11/1998 | Shwed et al. ......................... 709/229 |
| 5,842,224 | * | 11/1998 | Fenner ................................. 711/202 |
| 5,898,830 | * | 4/1999 | Wesinger, Jr. et al. .............. 713/201 |
| 5,999,530 | * | 12/1999 | LeMaire et al. ..................... 370/390 |
| 6,009,475 | * | 12/1999 | Shrader ................................ 709/249 |
| 6,098,172 | * | 8/2000 | Coss et al. ........................... 713/201 |

FOREIGN PATENT DOCUMENTS

| 9233112 | 9/1997 | (JP) . |
|---|---|---|
| 9321805 | 12/1997 | (JP) . |

OTHER PUBLICATIONS

Anderson, M. et al. *Delete Function for Package Files*, IBM Technical Disclosure Bulletin, 11/91, p. 394–396.
Pilgrim, J. R. et al. *Smart Compare Program for Verification of the 9370 Knowledge Base*, IBM Technical Disclosure Bulletin, 12/89, p. 25–26.

* cited by examiner

*Primary Examiner*—Dung C. Dinh
*Assistant Examiner*—Bradley Edelman
(74) *Attorney, Agent, or Firm*—Shelley M. Beckstrand (57) ABSTRACT IP network address translation (NAT) and IP filtering with dynamic address resolution in an Internet gateway system. Symbolic interface names are recognized in selected rule statements. An symbolic s-rule file is generated from these rule statements which includes symbolic interface names. During processing of a packet message, the s-rule file corresponding to the interface name in the packet message is processed, with symbolic addresses in the s-rule file resolved to the IP addresses obtained from the packet message.

9 Claims, 5 Drawing Sheets

SYSTEM AND METHOD FOR IP NETWORK ADDRESS TRANSLATION AND IP FILTERING WITH DYNAMIC ADDRESS RESOLUTION

CROSS REFERENCE TO RELATED APPLICATIONS

U.S. patent application Ser. No. 09/135,102 filed Aug. 17, 1998, U.S. Pat. No. 6,182,228 entitled "SYSTEM AND METHOD FOR VERY FAST IP PACKET FILTERING", filed concurrently herewith is assigned to the same assignee hereof and contains subject matter related, in certain respect, to the subject matter of the present application. The above-identified patent application is incorporated herein by reference.

BACKGROUND OF THE INVENTION

1. Technical Field of the Invention

This invention pertains to firewall capability for a gateway system. In particular, it relates to IP network address translation (NAT) and IP filtering with dynamic address resolution.

2. Background Art

Internet protocol (IP) network address translation (NAT) and IP filtering are functions which provide firewall-type capability to an Internet gateway system. In one specific system, this is accomplished by providing means for the system administrator to specify specific NAT and filtering rules via an operational navigator graphical user interface (GUI).

IP packet filtering is the process of checking each internet protocol (IP) packet that is going to be sent from or has just arrived at a gateway system, or node, in a communications network, and based upon that check of making a decision. The decision is (typically, and insofar as it relates to the preferred embodiment of this invention) whether the packet should be discarded or allowed to continue. These are termed the 'deny' and 'permit' actions. IP filtering is widely used in Internet firewall systems, by independent service providers (ISPs) and organizations connected to the Internet.

Filter rules are most commonly an ordered list of rules, processed sequentially from top to bottom (order is specified by the system administrator). Each rule permits a certain kind of IP traffic. Processing for an IP packet continues until the packet is permitted, explicitly denied, or there are no more rules, in which case it is denied. Usually a number of filter rules must be written for each protocol to be permitted.

The problem solved by this invention is: how can a system administrator write NAT and Filter rules when the IP address is not known?

It is, therefore, an object of the invention to provide an improved gateway system and method.

It is a further object of the invention to provide an improved system and method for specifying filter rules when the relevant IP address is not known.

It is a further object of the invention to provide a system and method for dynamically resolving IP addresses.

SUMMARY OF THE INVENTION

In accordance with the invention, a system and method is provided for a gateway system. Symbolic interface names are recognized in selected rule statements. A symbolic s-rule file is generated from these rule statements which includes symbolic interface names. During processing of a packet message, the s-rule file corresponding to the interface name in the packet message is processed, with symbolic addresses in the s-rule file resolved to the IP addresses obtained from the message.

Other features and advantages of this invention will become apparent from the following detailed description of the presently preferred embodiment of the invention, taken in conjunction with the accompanying drawings.

BEST MODE FOR CARRYING OUT THE INVENTION

This invention relates to IP network address translation (NAT) and Internet protocol (IP) filtering with dynamic address resolution. IP Network Address Translation (NAT) and IP Filtering functions provide firewall-type capability for, for example, a gateway system such as the IBM AS/400 system. This is accomplished by providing means for the system administrator to specify specific NAT and Filtering rules by way of a graphical user interface (GUI), such as the AS/400 Operational Navigator GUI.

In accordance with the preferred embodiment of the invention, a system administrator is enabled to write NAT and filter rules when the IP address is not known.

Figure 1:
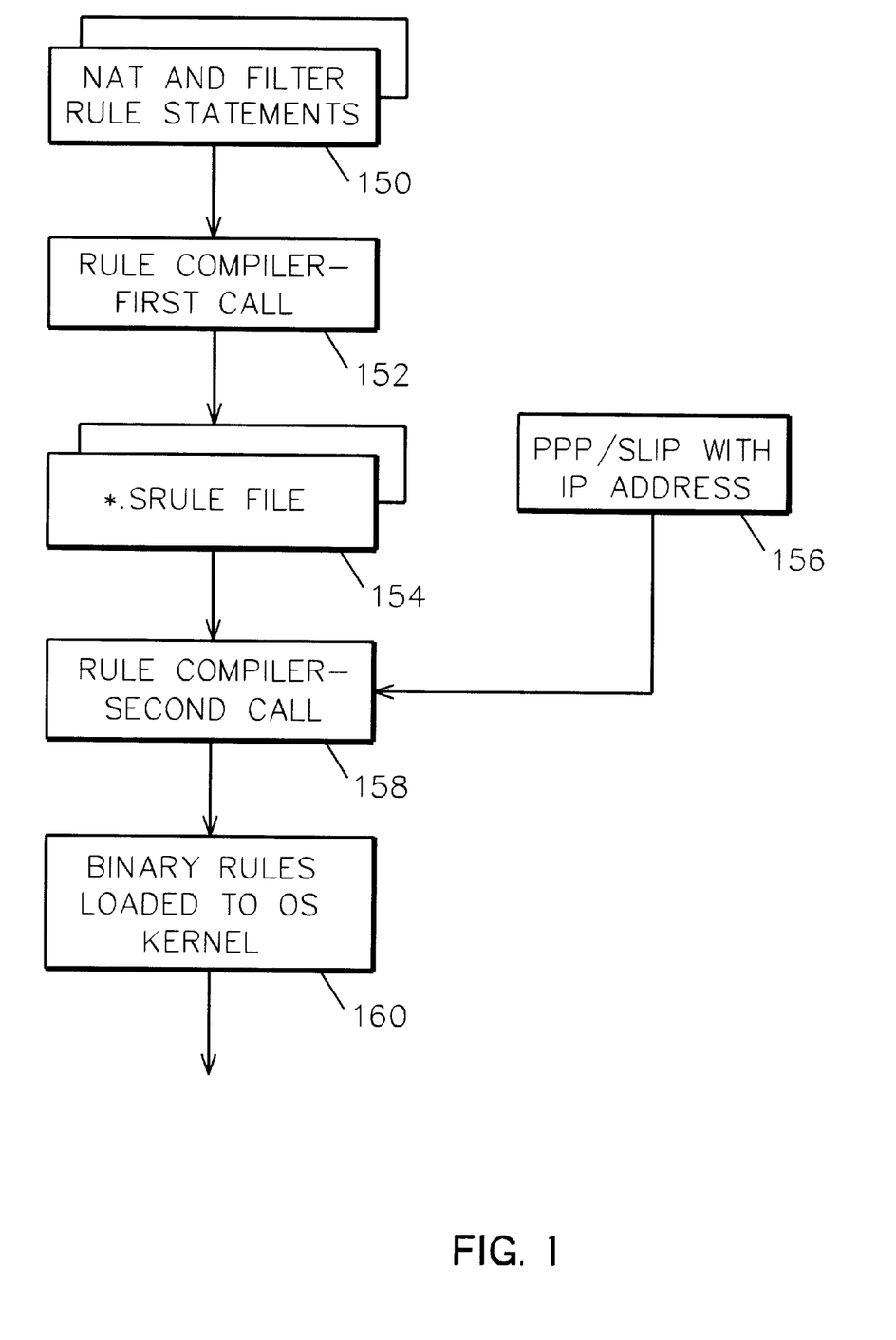
FIG. 1 illustrates key elements of IP network address translation and filtering with dynamic address resolution.

Referring to FIG. 1, key elements of the invention and the logical relationships and data flow among them are illustrated. In accordance with the preferred embodiment, all depicted function is implemented in the operating system, such as the IBM OS/400.

Referring to FIG. 1, a set of NAT and Filter rule statements 150 in one or more files is read by rule compiler 152, which produces a series of intermediate 's-rule' ('s' for symbolic) rule files 154 (among other files produced by the compiler). Each of these files 154 contains an almost completely binary representation of rules 150, one for each physical interface specified. Each file 154 has as part of its name, the PPP interface name with which rules 150 are to be associated.

Some time later, when PPP is starting a PPP (or SLIP) interface, a 'message' 156 is sent to (calls) the rule compiler 158. Message 156 contains the PPP interface name and the dynamically chosen (by PPP) IP address. Rule compiler 158 uses the PPP interface name to find the corresponding s-rule file 154. File 154 is then re-processed by the rule compiler 158, which makes an in-memory copy (not shown) of s-rule file 154, and substitutes in the proper places in the in-memory copy, the actual IP address (obtained from message 156 from PPP). As is represented by step 160, the in-memory copy of s-rule file 154 is then loaded to the operating system kernel. As will be described hereafter in connection with Table 3, it is in the operating system kernel (not shown) that the fully resolved binary rules are interpreted as IP datagram traffic is processed, to achieve the desired NAT and filter actions.

The process of starting a PPP interface with a new IP address may be repeated any number of times. Each time, a new binary image of resolved rules is produced and loaded, as described above.

There is an interlock between PPP and the rule compiler. If, for any reason, NAT and filter rules 150 which a customer has specified for a PPP interface should fail to load to the kernel, PPP is notified. It will then cause the interface to not start. This helps to protect the integrity of the customer's system, since NAT and Filter rules are typically used to prevent various kinds of undesirable behavior, associated with external (e.g. Internet) connections.

Figure 2:
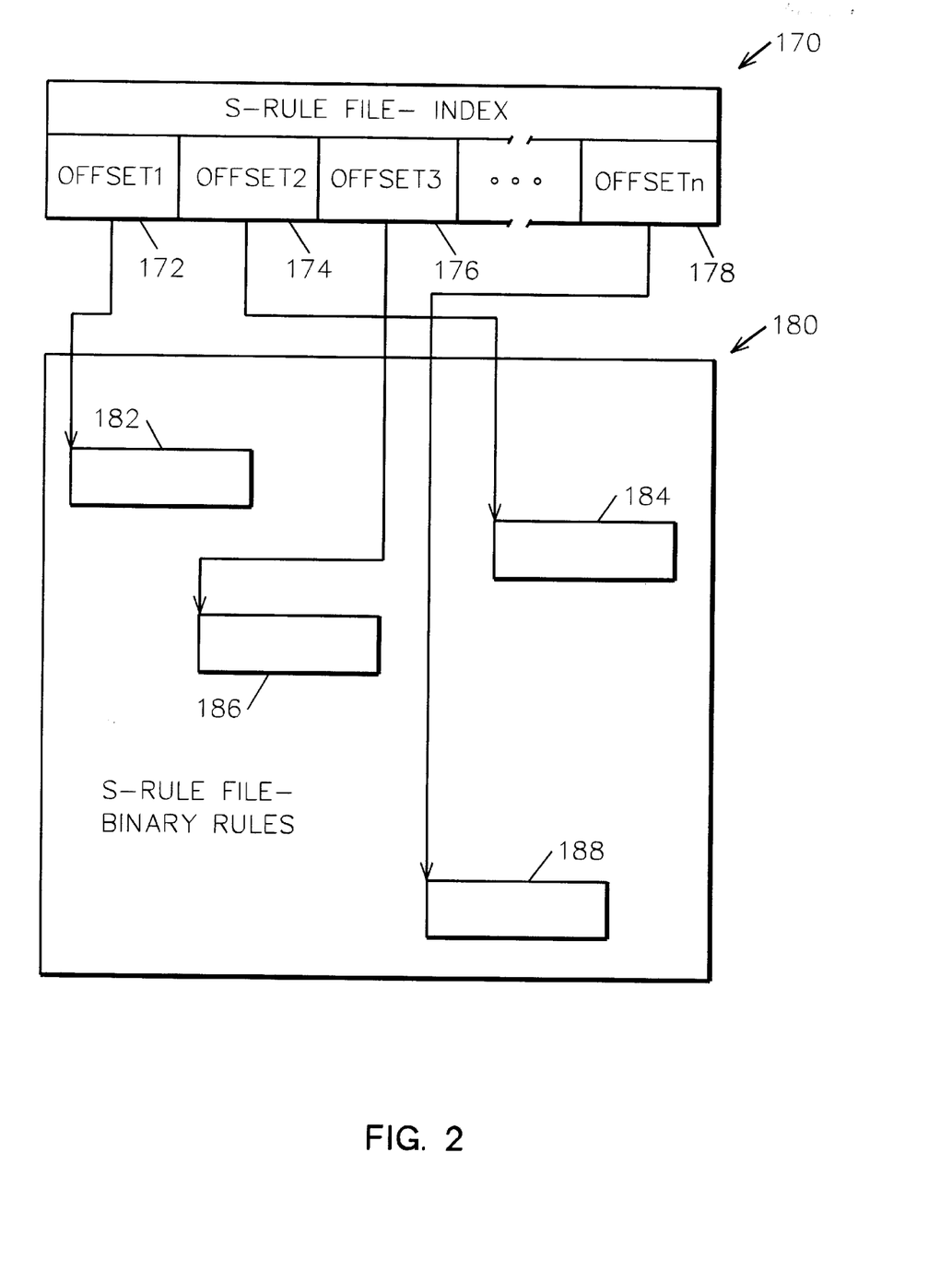
FIG. 2 illustrates the logical structure of a symbolic rule file.

Referring to FIG. 2, the logical structure of an s-rule file is shown. Each s-rule file has two logical parts, an index portion 170 and a binary rule portion 180. The index portion 170 contains any number of offsets 172, 174, 176, 178 into the binary rule portion 180.

Each offset 172, 174, 176, 178 points to a location 182, 184, 186, 188, respectively, within the binary rule portion 180, fields 4-octets in length, that should contain an IP address. Rule compiler 158, when processing the message 156 from PPP, will make an in-memory copy of the binary rule portion 180 of the s-rule, and will then iteratively process each offset 172, 174, 176, 178 in index portion 170. At each 'offset' location 182, 184, 186, 188, it places the value of the chosen IP address. When all offsets are processed, binary rule portion 180 is loaded to the operating system kernel.

In accordance with the method of the invention, the following three functional steps are executed:

1. As is represented by blocks 150, 152, processing the rule statements 200, 210, 220, 230, 280, 300, 320 and 330 (described hereafter in connection with FIGS. 3–10), and recognizing symbolic interface names where normally an IP address is expected (in selected statements). As will be described hereafter in connection with FIGS. 3–10, symbolic names include $address_{13}$ name, service_name, set_name, and interface_name.
2. As is represented by blocks 152 and 154, generating an s-rule file 170, 180. A separate s-rule file will be created for each physical interface for which the rules apply. A single index-portion is created once per s-rule file.
3. As is represented by blocks 154, 156, 158, 160, processing the PPP message to produce the loadable, fully resolved binary portion 180 of the s-rule file.

Tables 1–3 provide pseudo-code (C++—like syntax) descriptions of these three functional steps.

TABLE 1

Processing rule statements

```
while (more rule statements exist in file) {
    if (rule statement has symbolic IP address) {
        if (index-portion !exist for symbolic IP address)
        {
            create index-portion;
        }
        add current binary-offset to index-portion;
        generate binary form of rule;
```

TABLE 1-continued

Processing rule statements

```
    }
    else { // process statement as usual }
}
```

TABLE 2

Generating an s-rule file

```
for ( every index-portion created ) {
    create file named: <symbolic IP address>.srule;
    write the index-portion to the file;
    write the binary rules to the file;
    close the file;
}
```

TABLE 3

Processing a PPP message

```
try {
    obtain the PPP interface name from the message;
    open the file whose name contains the PPP interface
    name;
    read entire file, copying to in-memory buffer;
    obtain IP address from the message;
    for (each offset in index-portion of in-memory buffer)
    {
        locate the offset in the binary rule portion of
        buffer;
        set 4-octets at that location to the IP address;
    }
    load the binary portion of in-memory buffer to OS
    kernel;
}
catch ( any error ) {
    notify PPP that load failed;
}
return 'ok' to PPP;
```

Referring to FIGS. 3 through 10, NAT and filter rule statements 150 (FIG. 2) are entered by the user by way of a graphical user interface. In accordance with the preferred embodiment of the invention, the basic syntax of rule statements is as follows:

1. Each statement begins on a new line.
2. Continuation of statements is allowed across multiple lines, and is indicated by a '%' at the end of each continued line.
3. When duplicate symbolic names exist and error message is generated.
4. Statements occur sequentially, without grouping or nesting of statements.
5. Symbolic names (e.g., '$address_{13}$ name', 'service_name', 'set_name' may be up to 32 characters in length, made up of alphanumeric and '_' characters, first character alphabetic, and are case-insensitive (mixed is case allowed and all characters converted to upper case prior to processing.)
6. A symbolic interface_name is limited to 10 bytes in length. In the preferred embodiment, it is the name of an AS/400 Point-to-Point profile (PPP).
7. Any symbolic name referenced (e.g., used in FILTER or other statement) is defined prior to use.
8. Where a '*' is allowed as a value, it used to specify 'any possible value' in statements such as SERVICE, FILTER, etc. The only operand allowed to be used with '*' is '='.

Aspects of a complete set of rule statements are checked during processing to help achieve overall consistency across rule statements and with the system configuration. The order in which the different types of rules are processed is:

outbound: Filter, Map, Hide
inbound: Hide, Map, Filter

The key rule statement semantics checked are as follows:

1. If a FILTER rule is detected that conflicts with a MAP or HIDE rule, an error message is issued. The conflict can occur because of the order in which rules are processed. For example, if a FILTER rule for output IP packets references source IP addresses that also appear in a later NAT rule, an error message is issue.
2. The address_name2 in MAP and HIDE statements reference an existing interface.
3. HIDE and MAP statement conflicts cause an error message to be issued. An example is a HIDE and MAP pair which both apply to the same IP packets. Due to the order of rule processing, such an ambiguity complicates rule design and is treated as an error.
4. Multiple HIDE rules are allowed for the same interface and the address_name1 are logically combined into a larger set. Separate values for the HIDE statement JRN, MAXCON or TIMEOUT parameters are preserved. HIDE statements are executed in the order given.
5. Multiple MAP statements are allowed for an interface, but multiple MAP statements may not have the same address_name1 (if they do they are logically duplicate MAP statements).

Comments begin with '#', and may appear anywhere on a line. The remainder of the line is ignored.

Referring to FIGS. 3–10, in accordance with a preferred embodiment of the invention, the content and syntax of NAT and filter rule statements 150 (FIG. 2) will be described. In the following syntax descriptions, a '|' means "or", and separates alternative expressions for a value or operator.

Figure 3:
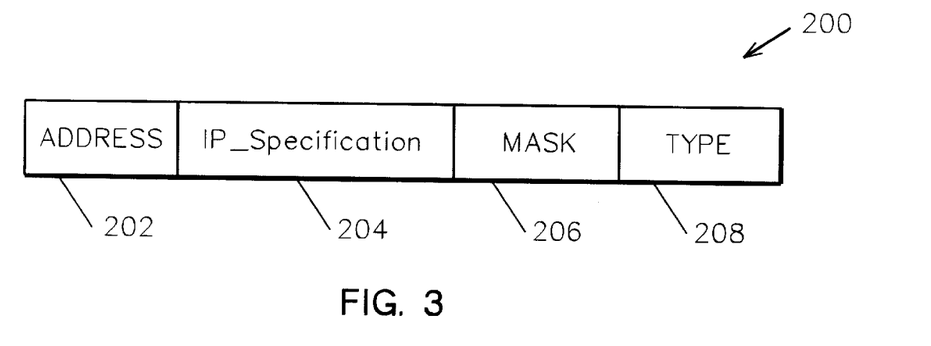
FIG. 3 illustrates the format of an ADDRESS statement.

Referring to FIG. 3, ADDRESS statement 200 is used to give a symbolic name to an IP address specification. An address specification can be a single address, range of addresses (specified with either a mask, count or start/end) or a group of non-contiguous addresses. This statement makes defining translation rules with the HIDE statement much easier. The ADDRESS statement is key to expressing symbolic interface names which are then used in later HIDE, MAP and FILTER statements. In HIDE and MAP statements address_name2 must have been previously expressed in an ADDRESS statement. In FILTER statements, address_name1 or address_name2 must have been previously expressed in an ADDRESS statement. In HIDE and MAP The syntax of ADDRESS statement 200 is:

ADDRESS field 202:
　ADDRESS address_name
IP_specification 204:
　interface_name | interface_name, ... }|
or
IP_specification 204:
　IP=| ipaddr | start_ipaddr THROUGH end_ipaddr | {ipaddr, ... } | LOCAL |
MASK field 206:
　MASK=| mask | bit_number |
TYPE field 208:
　TYPE=| TRUSTED | UNTRUSTED | BORDER |
where:
　address_name is an alphanumeric string used to represent an IP address specification. The address_name maybe used in later statements (e.g. FILTER, HIDE) in the member.

interface_name or {interface_name, ... } is the logical name for a PPP interface. A PPP interface requires a name other than an IP address since its IP address will be dynamic. Multiple interface names are entered by enclosing in brackets and separating each entry by a comma (','). Duplicate IP interfaces names are dropped without a warning message.

ipaddr is a single dotted decimal IP address.

ipaddr THROUGH ipaddr is an address range specified with a start and end IP address in dotted decimal format; for example, 9.130.69.255 THROUGH 9.130.69.255. Ascending or descending ranges are accepted.

{ipaddr, ipaddr, ... } is a group of address which are not necessarily contiguous. Duplicate address are dropped, with a warning message for each occurrence.

LOCAL indicates that the ADDRESS address_name refers to all IP address defined on this system. LOCAL always excludes the TCP/IP loop-back addresses (127.nnn.nnn.nnn, where nnn is an integer between 0 and 255), whether or not any are defined on the system. All LOCAL addresses are assumed to have the same subnet mask.

An ADDRESS statement 200 may define an address_name that includes a loop-back address by including a loop-back address (or range) in IP_specification 204.

mask is an address range specified with an address and mask in dotted decimal form: for example, 9.130.69.0 255.255.255.0. The mask can only be used to represent a contiguous range of addresses. The supplied mask value applies to all IP address contained in the statement. The mask parameter is ignored when a list of IP addresses or a range (using the form x THROUGH y) is specified.

bit_number is the last bit of the network portion of an IP address(es). Counting from left to right, starting with 0, this is the right-most bit that is part of the network portion of addresses. This provides an alternative method of representing a mask. The supplied bit_number value applies to all the IP addresses contained in the statement.

TYPE specifies a classification for the address(es). This classification is used during the processing of rule statements which reference address_name.

TRUSTED represents address(es) which can be considered trusted: that is, internal or private addresses. These addresses may or may not be globally unique Internet addresses. They may also be addresses within the range designated for use only within private internets by the IANA (RFC1918, section 3).

UNTRUSTED represents address(es) which can be considered untrusted: that is, external or public addresses. Generally, these will be IP addresses which are not owned by the organization controlling this system (that is, the system with the IP address is not owned by the same organization which owns this system).

BORDER represents address(es) which are on the boundary between a trusted and untrusted network. They are typically globally unique Internet addresses, and are owned by the organization which controls this system (that is, the system with the IP address is owned and controlled by the same organization that controls this system). For example, the interface of a machine connected to the Internet would be a BORDER address.

Figure 4:
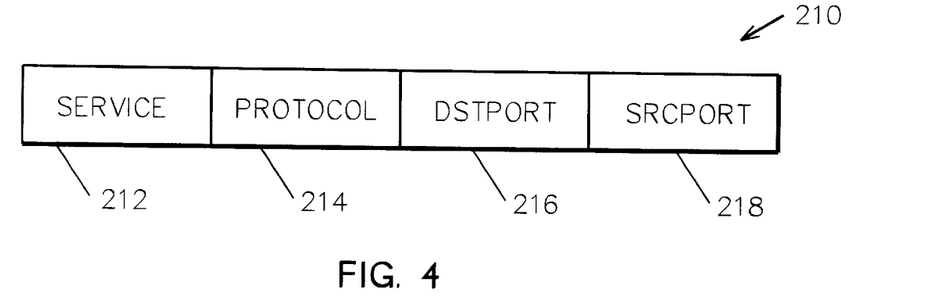
FIG. 4 illustrates the format of a SERVICE statement.

Referring to FIG. 4, SERVICE statement 210 is used to give a symbolic name to a particular transport protocol, source and destination port numbers. This can be used to clarify FILTER statements. The statement is optional. The syntax of FILTER statement 210 is as follows:

SERVICE field 212:
   SERVICE service_name
PROTOCOL field 214:
   PROTOCOL=|TCP | TCP/STARTING | UDP | number | * |
DSTPORT field 216:
   DSTPORT |=|<>|<|>|>=|<=| |number|*|
SRCPORT field 218:
   SRCPORT |=|<>|<|>|>=|<=| |number|*| where: service_name is an alphanumeric name given to the service which is a combination of transport protocol, source and destination port specifications. The service_name may be used in follow-on statements (e.g. FILTER).

PROTOCOL specifies the transport protocol. The most commonly used protocols such as TCP and UDP can be specified by keyword. Other, uncommon protocols (i.e. IP in IP encapsulation) can be specified by number. The keyword TCP/STARTING is used to designate any of the TCP packets used to establish a TCP session, via the three-way handshake. Specifically, this designates TCP packets with the synchronize (SYN) bit set to 1. When a number is specified for PROTOCOL, it must be in the range 0–255.

DSTPORT allows the specification of an operator and a destination port number. A '*' means 'any port', and may only be specified with the '=' operator.

SRCPORT allows the specification of an operator and a source port number. A '*' means 'any port', an dmay only be specified with the '=' operator.

Figure 5:
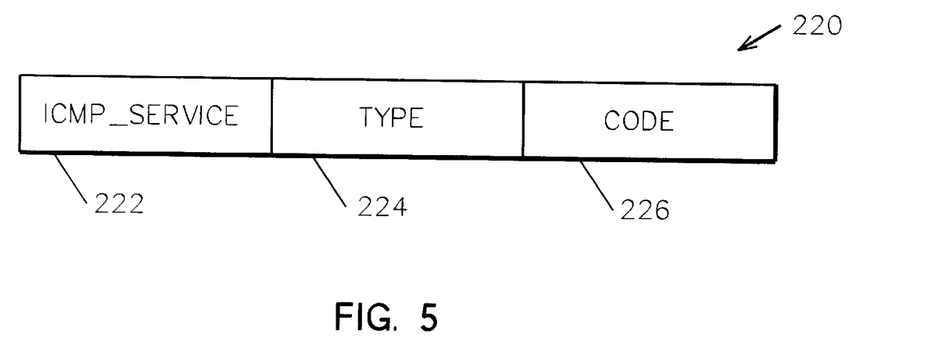
FIG. 5 illustrates the format of an ICMP_SERVICE statement.

Referring to FIG. 5, Internet Control Message Protocol ICMP_SERVICE statement 220 is used to give a symbolic name to a particular ICMP type and code combination. The statement is optional. This can be used to clarify the FILTER statements, and is generally used by IP implementations to control, facilitate and manage IP traffic. The syntax of the ICMP_SERVICE statement is as follows:

ICMP_SERVICE field 222:
   ICMP_SERVICE service_name
TYPE field 224:
   TYPE |=|<>|<|>|>=|<=| |typevalue | *|
CODE field 226:
   CODE |=|<>|<|>|>=|<=| |codevalue | *| where:
   service_name is an alphanumeric name given to the service which is a combination of ICMP type and code.
   TYPE allows the specification of an operator and a valid ICMP type value (range 0–255). An '*' means 'any code', and may only be specified with '='.

Figure 6:
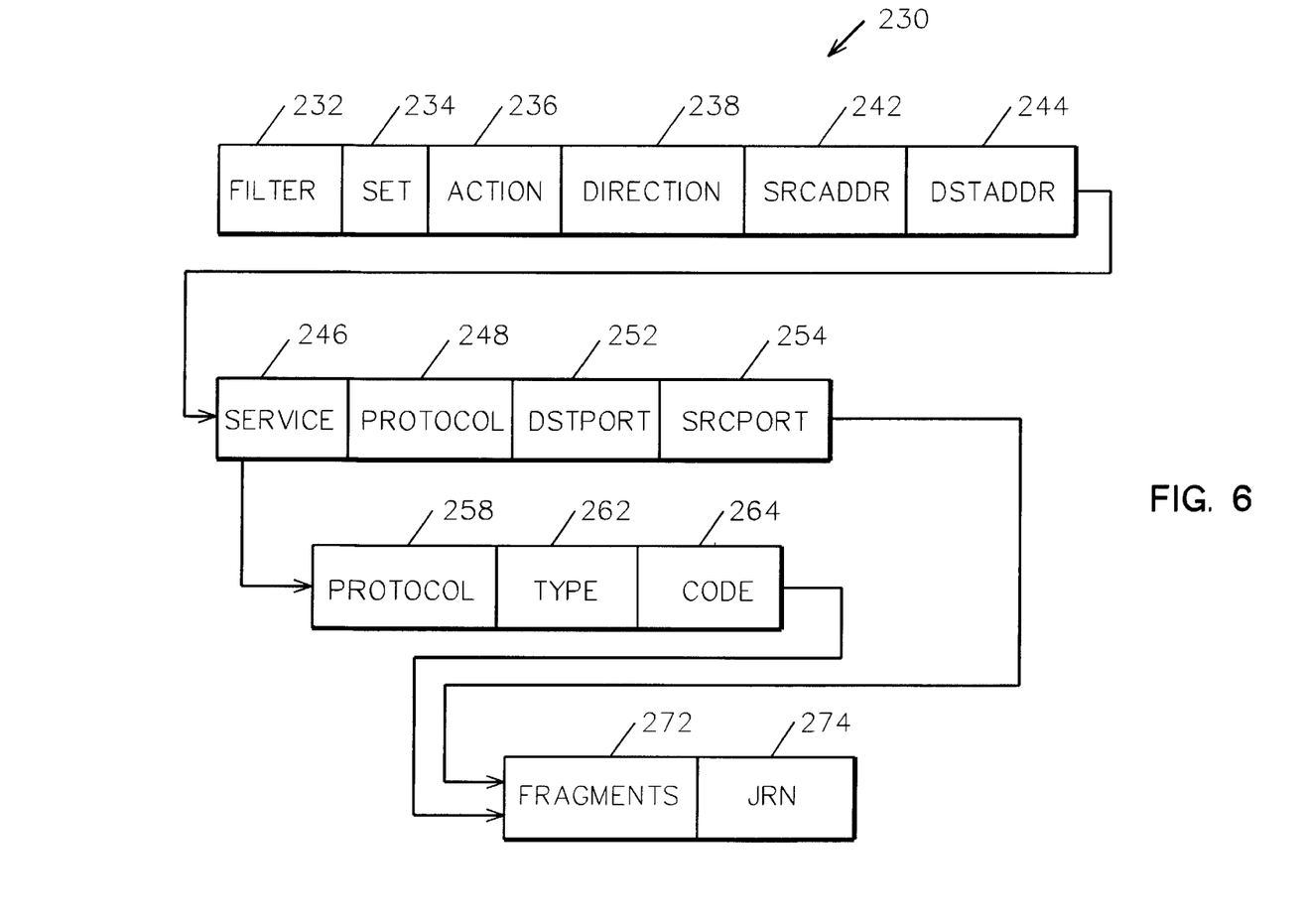
FIG. 6 illustrates the format of a FILTER statement.

Referring to FIG. 6, FILTER statement 230 has two functions: first, it defines a set of low level logical tests (or conditions) for an IP packet, and second, it puts those tests into a named, ordered collection ('set_name'). a FILTER statement 230 'works' by applying the specified checks against an IP packet. If, and only if, all the FILTER statement tests succeed, then the action (see ACTION 236, below) specified istaken. Multiple FILTER statements may be used to define a series of tests all grouped into the same filter set. FILTER statements 230 are interpreted in the same order, from top to bottom, as the FILTER statements 230 are physically ordered within set_name.

Some parameters of FILTER statement 230 allow a special value to be specified: "*". This is used to indicate that for the parameter, all possible values are acceptable. For optional parameters such as DSTPORT 252, specifying "*" has the same effect as not providing the parameter; that is, the IP packet destination port value is not checked. This syntax is provided to allow clearer expression of FILTER statements 230. When allowed for a parameter with multiple operands (for example, SRCADDR 242) such as "<>" (not equal), the "*" is only allowed with the "=" (equal) operand.

Figure 7:
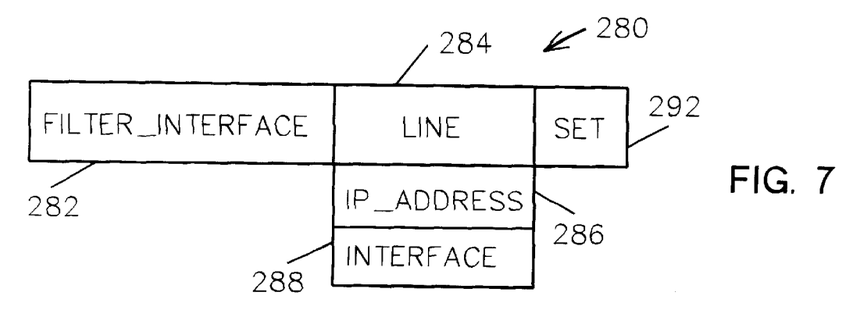
FIG. 7 illustrates the format of a FILTER_INTERFACE statement.

One a set of filtering tests is defined, it is associated with a TCP/IP interface using the FILTER_INTERFACE rule statement 280, FIG. 7.

The syntax of FILTER statement 230 is as follows:

FILTER field 232:
   FILTER
SET field 234:
   SET set_name
ACTION field 236:
   ACTION=| PERMIT | DENY |
DIRECTION field 238:
   DIRECTION=| INBOUND | OUTBOUND | *|
SRCADDR field 242:
   SRCADDR |=|<>| |ipaddr | address_name1 | * |
DSTADDR Field 244:
   DSTADDR |=<>| |IPADDR|address_name2 |*|
SERVICE field 246:
   SERVICE=service_name
PROTOCOL field 248:
   PROTOCOL=|TCP|TCP/STARTING| UDP|number| *|
DSTPORT field 252:
   DSTPORT |=|<>|<|>|>=|<=| | number |*|
SRCPORT field 254:
   SRCPORT |=|<>|<|>|>=|<=| | number |*|
PROTOCOL field 258:
   PROTOCOL=ICMP
TYPE field 262:
   TYPE |=|<>|<|>|>=|<=| |typevalue|*|
CODE field 264:
   CODE |=|<>|<|>|>=|<=| |codevalue|*|
FRAGMENTS field 272:
   FRAGMENTS=|NONE|HEADERS|*|
JRN field 274:
   JRN=|FULL|OFF| where:
   set_name (SET 234) is an alphanumeric name used to group multiple FILTER statements 230 together. This is the name that is used to associate FILTERs with interfaces.
   ACTION 236 indicates the action to take when an IP packet matches what is described by this FILTER statement 230. PERMIT means the packet will be allowed to be processed as usual. DENY means the packet will be blocked—that is the packet is immediately discarded, and no further processing will be done with the packet other than possibly logging the DENY action.
   DIRECTION 238 specifies the IP packet direction to which this FILTER statement should apply. INBOUND applies to inbound packets. The association of a set of FILTER rules with an interface is accomplished by FILTER_INTERFACE statement 280. OUTBOUND specifies outbound packets. An "*" specifies both inbound and outbound packets.
   SRCADDR 242 specifies the source address. When a simple and single IP address is intended, ipaddr is specified in dotted decimal notation. For more complicated specifications, an ADDRESS statement 200 is first used to define address_name1. Further usage notes are described below with respect to DSTADDR 244.

DSTADDR 244 specifies the destination address. When a simple and single IP address is intended, ipaddr is specified in dotted decimal notation. For more complicated specifications, an ADDRESS statement 200 is first used to define address_name2.

Usage notes for source and destination address 242, 244:
1. Neither address_name1 nor address_name2 may include a symbolic address (interface_name). An interface_name is used in a FILTER INTERFACE statement 280 to associate filter rules with a particular symbolic interface.
2. If both address_name1 and address_name2 are lists of IP addresses, then the FILTER statement 230 is checking all possible pairs of IP address for SRCADDR 242 and DSTADDR 244. For example, if SRCADDR is the list {1.2.3.4, 1.2.3.5, 1.2.3.6} and DSTADDR is the list {7.6.5.4, 7.6.5.3}, then this single FILTER statement will check for these IP packets:

| source address | destination address |
| --- | --- |
| 1.2.3.4 | 7.6.5.4 |
| 1.2.3.4 | 7.6.5.3 |
| 1.2.3.5 | 7.6.5.4 |
| 1.2.3.5 | 7.6.5.3 |
| 1.2.3.6 | 7.6.5.4 |
| 1.2.3.6 | 7.6.5.3 |

The type of service can be specified one of several ways: SERVICE, PROTOCOL or ICMP_SERVICE statement.

PROTOCOL 248/DSTPORT 252/SRCPORT 254 defines service in terms of transport protocol, source and destination ports. The keyword TCP/STARTING is used to designate any of the TCP packets used to establish a TCP session via the three-way handshake. Specifically, this designates TCP packets with the synchronize (SYN) bit set to 1.

PROTOCOL 258/TYPE 262/CODE 264 defines service in terms of ICMP type and ICMP code. The values for typevalue and codevalue are in the range 0–255.

FRAGMENTS 272, if NONE, which is the default, only non-fragments can match. FRAGMENTS=HEADERS means that only fragment headers match. FRAGMENTS=* means that IP fragments are not to be considered; that is, all IP packets are processed independently of whether they are fragments or not. If this option (*) is used, the DSTPORT and SRCPORT options cannot be specified because FILTER statement 232 would be internally inconsistent. This is because IP fragments do not have port numbers.

JOURNAL 274 specifies the level of journaling. Default is OFF. If JOURNAL=FULL, a journal entry is created if the action specified by ACTION parameter 236 is taken.

Referring to FIG. 7, FILTER_INTERFACE statement 280 specifies a set of FILTER statements 230 to be associated with an interface. There can only be one FILTER_INTERFACE statement 280 specified per interface. Multiple set names can be included on the same FILTER_INTERFACE statement if needed. The syntax for the FILTER_INTERFACE statement is as follows:

FILTER_INTERFACE field 282:
    FILTER_INTERFACE
LINE field 284:
    LINE=line_name
IP_ADDRESS field 286:
    IP_ADDRESS=ipaddr
INTERFACE field 288:
    INTERFACE=interface_name
SET field 292:
    SET=set_name, . . .
where:
line_name is the name of a valid line description. Filter rules will applied to the physical interface. This filter physical interface may have more than one IP address associated with it (and if so, is referred to as a multi-homed interface).

ipaddr is the IP address of the interface with which to associate this filter rule set. The rule set will be bound to the physical interface to which this IP address is connected.

interface_name is the symbolic name given to this IP interface. This will associate this filter rule set with the physical interface to which this logical interface is connected. This allows the definition of rules before the interface, and allows rules to be associated with interfaces that may not currently have IP addresses (for example, Point-to-Point links). For Point-to-Point, the PP profile name is used. set_name is the name of one or more sets of FILTER statements 230. A set may consist of a single FILTER statement 230. When more than a single set of rules is specified on FILTER_INTERFACE statement 280, the order specified is the order in which the tables are generated and the rules processed. After the last FILTER statement 230 of the last set_name an implicit rule is always inserted. This rule may be referred to as the 'deny default' rule because it is logically equivalent to the following:

FILTER <set_name>
    ACTION=DENY %
    DIRECTION=* %
    SRCADDR=* %
    DESTADDR=* %
    FRAGEMENTS=NONE %
    JRN=OFF The effect is that all IP packets not previously allowed to process by some earlier FILTER rule will be blocked by this 'deny default' rule, and no fragments allowed and no journal entry made. This provides a security feature, since all IP traffic not explicitly permitted by administrator configured rules (FILTER statements 230) is blocked, making it difficult to mistakenly allow some kind of unwanted IP traffic.

Figure 8:
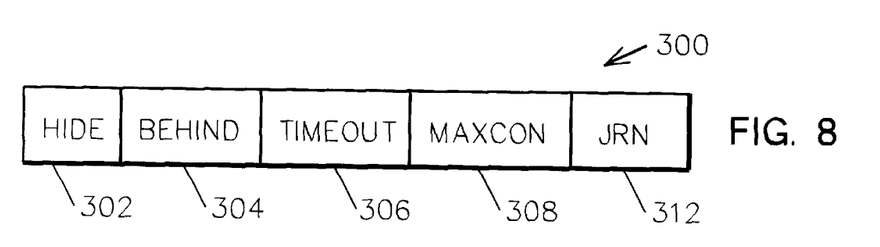
FIG. 8 illustrates the format of a HIDE statement.

Referring to FIG. 8, HIDE rule statement 300 is used to specify which addresses are to be hidden behind a single interface. This is known as 'masquerade', a type of network address translation. Because masquerade NAT is a many-to-one mapping, conversations may be initiated from one of the masqueraded IP addresses. This is an important difference between masquerade and static NAT. However, a variation of masquerade allows the conversation to be initiated from external systems. This is done by a) specifying a single address for address_name1, and b) specifying a specific port number for each address. Traffic initiated from address_name1 works as normal masquerade. Traffic initiated from external systems with destination IP address_name2 and destination port of port_number2, are translated to destination IP address_name1, destination port of port_ number1. The designation of address_name2 may be one or more interface names (currently, a PP profile name).

The syntax of HIDE statement 300 is as follows:
HIDE field 302:
   HIDE address_name1
BEHIND field 304:
   |BEHIND address_name2 | port_number1 BEHIND address_name2: port_number2|
TIMEOUT field 306:
   TIMEOUT=time
MAXCON field 308:
   MAXCON=conversations
JRN field 312:
   JRN=|OFF|FULL|STARTS|
where:
   address_name1 specifies the address or addresses that will be translated. Hence, these addresses will not appear as the source IP address on outgoing packets. On incoming IP packets, these addresses replace the packet destination IP address. An ADDRESS statement 200 must have defined address_name1 prior to its use in a HIDE statement 300. All the addresses in address_name1 must be TRUSTED.
   address_name2 is the masquerade address. Outbound IP packets have their source IP translated to this address. A reverse process happens for inbound IP packets and the packet is correctly addressed. The name address_name2 must resolve to a single BORDER (see field 208) IP address and any mask specified for address_name2 is ignored. A special masquerade, known as 'port translation', is defined by using the optional port specifications on each address. In so doing, the following restrictions apply: (1) if either address_name1 or address_name2 is given a port number, then both must be given a port number; (2) if port numbers are supplied, then address_name1 must resolve to a single TRUSTED address; and (3) because port numbers are specified, this type of masquerade can only be used with transport protocols TCP and UDP and it is recommended that only TCP and UDP applications that have well-known port numbers be specified.
   BEHIND address_name specifies the global (BORDER) address to which the local address will be translated. And address_name that represents more than one address causes an error.
   TIMOUT=time represents the time, in seconds, that an idle connection remains active. After this time, the resources used (such as client port, etc.) are released. Default timeout value is 16 seconds, and the value range is 1 to 86,400 seconds. This is applicable for all protocols except for Telnet, which has a timeout of two hours.
   MAXCON=conversations represents the number of concurrent masquerading conversations that are allowed at any one time. This can be used to help adjust the system load incurred by masquerade processing.
   JRN=STARTS or FULL or OFF specifies the level of journaling performed for this NAT entry. The value STARTS specifies that only starting datagrams for a TCP session should be logged (no UDP logging traffic is logged with this setting). The value FULL causes log entries to be created for every IP packet (including UDP) that is translated by this statement. The default value is OFF.

Figure 9:
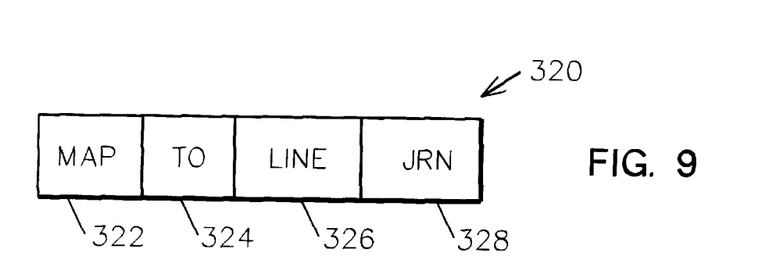
FIG. 9 illustrates the format of a MAP statement.

Referring to FIG. 9, MAP rule statement 320 is used to define a static NAT rule. This type of network address translation works by translating all occurrences of address_name1 as a source IP address to address_name2 for outgoing packets and by translating destination IP address address_name2 into address_name1 for incoming packets. In contrast to masquerade NAT (HIDE statement 300), conversations may be initiated in either direction. Because mapping is 1-to-1 with a static NAT rule, conversations may be initiated from outside (that is, UNTRUSTED) IP address_name2 to address_name1. This is different than defining a 1-to-1 masquerade rule. The designation of address_name2 may be one or more interface names (currently, a PP profile name).

The syntax of the MAP statement 320 is as follows:
MAP field 322:
   MAP address_name1
TO field 324:
   TO address_name2
LINE field 326:
   LINE=line_name
JRN field 328:
   JRN=|OFF|FULL|STARTS|
where:
   line_name is the name of a valid line description. Static NAT rules are applied to a physical interface or line. Since neither the right or left hand side of a MAP statement has to be an interface on this machine, the line specification is required. This also allows specifying a static NAT rule across multiple relevant lines, with the same values for address_name1 and address_name2. The use of line_name ensures the proper network address translation occurs, regardless of which line happens to receive the IP traffic.
   Both address_name1, address_name2 must resolve to a single IP address. In addition, address_name1 must be a TRUSTED address and address_name2 must be a TRUSTED or BORDER address.
   JRN=STARTS or FULL or OFF specifies the level of journaling that should be performed for this NAT entry. The value STARTS specifies that only starting datagrams for a TCP session should be logged (no UDP logging traffic is logged with this setting). The value FULL causes log entries to be created for every IP packet that is translated by this statement. The default value is OFF.

Figure 10:
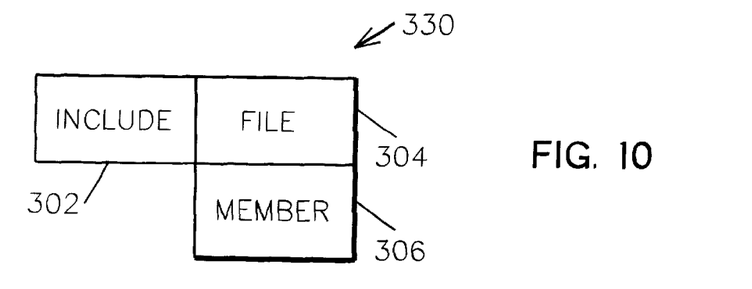
FIG. 10 illustrates the format of an INCLUDE statement.

Referring to FIG. 10, INCLUDE statement 330 is provided as a mechanism to help manage multiple files of rules, improve consistency and reduce possible sources of error. The statement causes a named file to be inserted in the processed text stream, in place of the INCLUDE statement. The statement is optional, and may be used anywhere in a rule file. It must occur between statements (after the end of some statement and before the beginning of another). The maximum depth of nested INCLUDE statements is 32.

The syntax of INCLUDE statement 330 is as follows:
INCLUDE field 302:
   INCLUDE
FILE field 304:
   FILE=filename
MEMBER field 306:
   MEMBER=membername
where:
   filename specifies an existing file in the file system (such as an existing AS/400 file in the QOpenSys file system).

Example:

INCLUDE FILE=/admin115/tcpip/config/fn_rules/ruleset1 membername represents an existing member of a source physical file in the file system (such as an existing AS/400 member of a source physical file in QSYS.LIB). Example:

INCLUDE MEMBER=/QSYS.LIB/EBBTEST.LIB/QCSRC.FILE
/RULECK1.MBR

When filter or NAT rules are changed below the machine interface (MI), an audit journal record is created. Address translation is controlled using the HIDE and MAP statements in the NAT configuration file. The JRN switch on these statements is used to control the level of journaling.

IP filtering is controlled at the interface level with the FILTER_INTERFACE statement in the IP filtering configuration file. The JRN switch is used to control the level of journaling.

ADVANTAGES OVER THE PRIOR ART

It is, therefore, an advantage of the invention that an improved gateway system and method is provided.

It is a further advantage of the invention that there is provided an improved system and method for specifying filter rules when the relevant IP address is not known.

It is a further advantage of the invention that there is provided a system and method for dynamically resolving IP addresses.

It is a further advantage of the system and method of the preferred embodiment of this invention that system administrators are enable to write NAT and filter rules without knowing before hand what specific IP address will be employed. They write one set of rules which may be reused multiple times, for different IP addresses.

ALTERNATIVE EMBODIMENTS

It will be appreciated that, although specific embodiments of the invention have been described herein for purposes of illustration, various modifications may be made without departing from the spirit and scope of the invention. In particular, it is within the scope of the invention to provide a memory device, such as a transmission medium, magnetic or optical tape or disc, or the like, for storing signals for controlling the operation of a computer according to the method of the invention and/or to structure its components in accordance with the system of the invention.

Accordingly, the scope of protection of this invention is limited only by the following claims and their equivalents.

We claim:

1. Method for operating a gateway system, comprising the steps of:
   recognizing symbolic interface names in a statement file of rule statements;
   generating from said rule statements a symbolic rule file;
   responsive to a packet message including an interface name, selecting a corresponding symbolic rule file and resolving symbolic addresses obtained from said message;
   said generating step further including the steps of:
      generating an index portion of said symbolic rule file;
      generating a binary rule portion of said symbolic rule file;
      said index portion containing at least one offset pointer into said binary rule portion; and
      said binary rule portion including at offsets indexed by each of said offset pointers at least one corresponding field for receiving a resolved address.

2. The method of claim 1, said resolving step further comprising the steps of:
   iteratively processing each said offset pointer to load into each said corresponding field an address obtained from said packet message.

3. The method of claim 2, further comprising the step executed following said processing step of:
   loading said binary rule portion to an operating system kernal for executing said rule statements selectively to permit or deny said packet message.

4. The method of claim 1, the step for generating an index portion comprising the further steps of:
   while more rule statements exist in said statement file,
      if this rule statement has a first symbolic address and
         if said index portion does not exist for said first symbolic address,
            creating said index portion for said first symbolic address; and
the step for generating a binary portion comprising the further step of:
   adding a current binary-offset to said index portion to provide said offset pointer and generating into said binary portion a binary form of said this rule.

5. Method for operating a gateway system, comprising the steps of:
   recognizing symbolic interface names in a statement file of rule statements;
   generating from said rule statements a symbolic rule file;
   responsive to a packet message including an interface name, selecting a corresponding symbolic rule file and resolving symbolic addresses in said corresponding symbolic rule file to addresses obtained from said message;
   said generating step further including the steps of:
      for each symbolic interface name, creating a symbolic rule file including an index-portion corresponding to said symbolic interface name and a binary rule portion, writing said index-portion to said symbolic rule file, and writing said binary rule portion to said symbolic rule file.

6. The method of claim 5, further comprising the steps of:
   processing a message by
      obtaining an interface name from said packet message;
      opening a first symbolic rule file corresponding to the interface name from said packet message;
      opening a first symbolic rule file corresponding to the interface name from said packet message;
      copying said first symbolic rule file to form a second symbolic rule file;
      obtaining a first address from said packet message;
      for each offset in said index-portion,
         locating a corresponding offset in said symbolic rule file and setting said corresponding offset to said first address; and thereafter
   loading a portion of said second symbolic file containing said rules and said first address to said operating system kernal for executing said rules to selectively permit or deny said packet message.

7. A gateway system, comprising:
   a rule statement file of rule statements, at least one said rule statement including a symbolic interface name;

a symbolic rule file genera ted from said rule statement including an index portion and a rules portion; said index portion including offset pointers into said rules portion at locations for receiving resolved IP addresses;

are solved rule file corresponding to said symbolic interface name containing at locations in said rules portion indexed by said offset pointers resolved symbolic addresses obtained from a packet message; and an operating system kernal responsive to said resolved rule file f or executing said rule statements to selectively deny or permit said packet message.

8. A program storage device readable by a machine, tangibly embodying a program of instructions executable by a machine to perform method steps for operating a gateway system, said method steps comprising:

recognizing symbolic interface names in a statement file of rule statements;

generating from said rule statements a symbolic rule file;

responsive to a packet message including an interface name, selecting a corresponding symbolic rule file and resolving symbolic addresses in said corresponding symbolic rule file to addresses obtained from said message;

said generating step further including for each symbolic interface name, creating a symbolic rule file including an index-portion corresponding to said symbolic interface name and a binary rule portion, writing said index-portion to said symbolic rule file, and writing said binary rule portion to said symbolic rule file.

9. An article of manufacture comprising:

a computer useable medium having computer readable program code moans embodied therein for operating a gateway system, the computer readable program means in said article of manufacture comprising:

computer readable program code means for causing a computer to effect recognizing symbolic interface names in a statement file of rule statements;

computer readable program code means for causing a computer to effect generating from said rule statements a symbolic rule file;

computer readable program code means for causing a computer to effect responsive to a packet message including an interface name, selecting a corresponding symbolic rule file and resolving symbolic addresses in said corresponding symbolic rule file to addresses obtained from said message; and said computer readable program code means for causing a computer to effect generating from said rule statements a symbolic rule file further generating an index portion of said symbolic rule file and generating a binary rule portion of said symbolic rule file;

said index portion containing at least one offset pointer into said binary rule portion; and said binary rule portion including at offsets indexed by each of said offset pointers at least one corresponding field for receiving a resolved address.

\* \* \* \* \*

UNITED STATES PATENT AND TRADEMARK OFFICE
CERTIFICATE OF CORRECTION

PATENT NO.   : 6,266,707 B1                                        Page 1 of 1
DATED        : July 24, 2001
INVENTOR(S)  : Edward B. Boden, Wesley A. Brzozowski, Mark C. Bullock, Scott C. Parks and
               Michael D. Williams It is certified that error appears in the above-identified patent and that said Letters Patent is hereby corrected as shown below:

Column 15, claim 7,
Line 1, please remove "genera ted" and insert -- generated --.
Line 5, please remove "are solved" and insert -- a resolved --.
Line 10, please remove "f or" and insert -- for --.

Column 16, claim 9,
Line 3, please remove "moans" and insert -- means --.
Line 16, please move this sentence up to line 15 (claim 9, column 16) after "ing" so that it is one continuous sentence starting at line 12 (claim 9, column 16).

Signed and Sealed this

Second Day of April, 2002

*Attest:*

*Attesting Officer*

JAMES E. ROGAN
*Director of the United States Patent and Trademark Office*